United States Patent

[11] 3,626,017

[72] Inventor Robert E. Moore
  Wilmington, Del.
[21] Appl. No. 688,679
[22] Filed Dec. 7, 1967
[45] Patented Dec. 7, 1971
[73] Assignee Sun Oil Company
  Philadelphia, Pa.

[54] BRIDGEHEAD BROMO-CHLORO ADAMANTANES AND THEIR PREPARATION
  3 Claims, No Drawings
[52] U.S. Cl. ..................................... 260/648 R,
  260/514 R, 260/561 R, 260/649 R
[51] Int. Cl. .................................... C07c 17/20,
  C07c 23/18
[50] Field of Search .......................... 260/648,
  649

[56] References Cited
  UNITED STATES PATENTS
  3,335,193 8/1967 Olah .......................... 260/648

FOREIGN PATENTS
1,101,410 3/1961 Germany ..................... 260/648

OTHER REFERENCES
Houben-Weyl " Meth. Der. Org. Chem." Vol. 5/4 pp. 354 and 355 (1960) QD258 187

*Primary Examiner*—Howard T. Mars
*Attorneys*—George L. Church, Donald R. Johnson, Wilmer E. McCorquodale, Jr. and Kenneth H. Johnson ABSTRACT: Novel adamantane compounds having a bromo and a chloro substituent at bridgehead positions are prepared by reacting a dibromadamantane with a chloro donor in the presence of a Lewis acid. For example, 1,3-dibromo-adamantane is reacted with carbon tetrachloride in the presence of a mixed Lewis acid catalyst of $BBr_3$ and $AlBr_3$. The product was a mixture of the 1,3-dibromo-1,3-dichloro-and 1-bromo-3-chloroadamantane.

BRIDGEHEAD BROMO-CHLORO ADAMANTANES AND THEIR PREPARATION

BACKGROUND OF THE INVENTION

Adamantane (tricyclo-[3.3.1.1$^{3,7}$]decane) has a carbon structure containing 10 carbon atoms arranged in a completely symmetrical, strainless manner, wherein four of the carbon atoms are in bridgehead positions in the rings. The typographical structure of adamantane is often represented as:

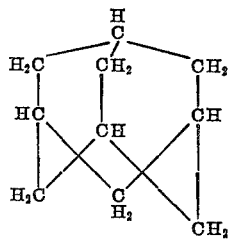

There are four tertiary hydrogen atoms, one at each bridgehead carbon atom. All four bridgehead carbon atoms are equivalent to each other and likewise all rings are equivalent.

Much research is being carried on with these unique polycyclic aliphatics. As research continues it has been found that the adamantane moiety when substituted for analogous hydrocarbons gives new and unexpected properties to the resulting compounds. This has been observed in polymers, insecticides, pharmaceuticals, etc. Thus, there is a stimulation for continual investigation on the broadest possible basis.

In this regard the haloadamantanes often serve as starting materials for the synthesis of adamantane compounds having various functional groups that are of interest to the researchers. For example the bromo groups can be converted to hydroxyls thus making possible the preparation of polyesters containing an adamantane moiety. Numerous examples are found in the art, many of which are shown in "Adamantane: Consequences of the Diamonoid Structure," Fort Jr., et al. Chem. Rev. 64 (1964) pp 277–300.

Bromo and chloro adamantane compounds are well known in the art. However, until now no mixed bromo-chloroadamantanes have been known. The advantage of the mixed bromo-chloroadamantanes of the present invention lies in the substantial difference in reactivity of the two functional groups, i.e., bromo and chloro. The bromo group is removed under milder conditions than the chloro group, leading to improved and simplified procedures for preparing difunctional derivatives containing different functional groups. For example an adamantane derivative having an amine function and a carboxyl function, can be prepared as:

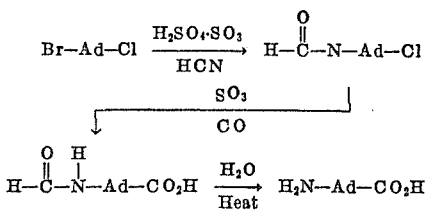

This material can be employed to produce polyamides containing only adamantane in the backbone by a process such as that shown in commonly assigned U.S. patent application S.N. 679,199 filed Oct. 30, 1967, now Pat. No. 3,464,957.

SUMMARY OF THE INVENTION

The present invention relates to novel adamantane monomers. Briefly stated the invention is a bromo-chloroadamantane of the structure

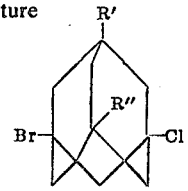

wherein R' and R" have zero–20 carbon atoms independently selected from the group consisting of hydrogen and hydrocarbyl. The term hydrocarbyl is used to designate a hydrocarbon radical. Preferably R' and R" are selected from the group consisting of hydrogen, alkyl, cycloalkyl and aryl and more preferably are alkyl, particularly methyl and ethyl.

The substitution of chloride for bromide in dibromoadamantanes can be achieved by a process that can be described as comprising contacting a dibromoadamantane having the structure

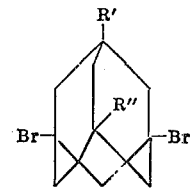

wherein R' and R" have the significance previously given with a chloride donor in the presence of a Lewis acid containing a bromide, chloride or iodide atom.

DESCRIPTION OF THE INVENTION

The adamantane starting material used to produce the present bromo-chloroadamantane is an adamantane having the general formula

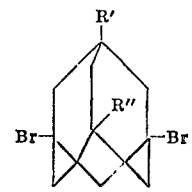

where R' and R" have the significance previously given.

The alkyl or cycloalkyl adamantane compounds can be produced according to the method disclosed by Schneider et al. Journal of the American Chemical Society, Vol. 86, pages 5365–5367. The arylated adamantane compounds can be produced by reacting a bromo-adamantane compound with an excess of aromatic compound in a procedure such as that employed by Stetter et al. Ber. 97 (12) pages 3488–92 (1964). The substituted adamantane for the present invention can have either nonbranched or branched alkyl groups and can have one or more cycloalkyl or aryl radicals in the substituted adamantane moiety with the total number of carbon atoms in each R group ranging up to 20.

The dibromo adamantane can be prepared by reacting the parent hydrocarbon with bromine in the presence of a bromination catalyst such as BBr$_3$ or AlBr$_3$ or mixtures thereof for about 3 hours. Such a process is shown by Stetter and Wulff, Ber., 93, 1366 (1960).

Examples of such reactants are the 5,7-dibromo-derivatives of the following hydrocarbons: adamantane; 1-methyladamantane; 1-ethyladamantane; 1,3-diethyladamantane; 1-methyl-3-ethyladamantane; 1,3-diethyladamantane; 1-n-propyladamantane; 1-isopropyladamantane; 1-n-butyladamantane; 1,3-di-n-pentyladamantane; 1-methyl-3-heptyladamantane; 1-n-decyladamantane; 1-n-decyl-3-ethyladamantane; 1-methyl-3-propyladamantane; 1-isohexyladamantane; 1-methyl-3-cyclohexyladamantane; 1-phenyladamantane; 1-methyl-3-phenyladamantane; 1,3-phenyladamantane and the like.

In regard to the structure given above, the substituents specified at the bridgehead positions R' and R" can be hydrogen atoms. These are active sites constituting spots in the molecule where oxidation and peroxide formation can occur. Preferred compositions have no tertiary hydrogen atoms in the adamantane moiety, thus in preferred compositions R' and R" will be selected from the group consisting of alkyl, cycloalkyl and aryl. More preferably because of the ease with which they can be obtained, the bridgehead substituents will be methyl or ethyl or both.

The process of converting the dibromoadamantane to the bromo-chloroadamantane is carried out by contacting the dibromo compound with a chloride donor in the presence of a Lewis acid catalyst containing a bromo, chloro or iodo atom. This can be achieved easily. In one embodiment the chloride donor is added directly to the reaction mixture wherein the dibromoadamantane was prepared and the chloro-bromo interchange occurs with the bromination catalyst. The reaction is very rapid. Almost immediately after addition of the chloride donor the catalyst is deactivated. The diactivation is achieved with a basic material such as sodium hydrogen sulfite, sodium carbonate, sodium hydrogen carbonate and the like. The product of the reaction consists of a mixture of dibromo starting material, bromo-chloro- and dichloro-adamantane. A longer reaction time will not result in a complete conversion to the dichloro, there being an equilibrium between the three analogues, but longer reaction times will favor the production of the dichloro analogue to the dimunition of the bromo-chloroadamantane.

The chloride donor is any chloride compound which will give up a chloride under the conditions of the bromo-chloro interchange. The conditions of the interchange are (1) atmospheric, although sub- or superatmospheric can be used (2) at a temperature in the range of 10° to 75° C. although ambient is preferred and (3) in the presence of a Lewis acid catalyst which has a bromo, chloro or iodo therein.

Some suitable chloride donors include carbon tetrachloride, chloroform, chlorine, HCl, ferric chloride and the like. Carbon tetrachloride and chloroform are preferred. The ease with which a particular chloride donor gives up its chloride will influence to a degree the rate of reaction, however, the interchange will still take place at least to some extent, immediately. It is well within the skill of one in the art to determine for any particular chloride donor the optimum reaction time.

The catalyst is a Lewis acid, i.e., a substance that can take up an electron pair to form a covalent bond, said catalyst containing bromide, chloride or iodide atom, for example ferric chloride, aluminum chloride, boron tribromide, stannic chloride, zinc chloride, aluminum bromide, aluminum iodide, HCl and other Lewis acids of equal strength. The absence of either a bromo, chloro or iodo group in the catalyst results in a failure of the bromo-chloro interchange to occur.

The halogen in the catalyst is essential since it is believed that the mechanism involves a halogen-halogen interchange into which the halogen of the catalyst enters. The fluorides are not suitable as catalyst because the lewis acids containing the fluoride tend to hold the fluoride too tightly so as to prevent the necessary halogen-halogen interchange.

In another embodiment the dibromo adamantane is dissolved in a suitable solvent, the chloride donor and the catalyst are added and the reaction terminated immediately thereafter. Suitable solvents include, carbon tetrachloride, chloroform, dimethylsulfoxide dimethylformamide, and promine. It is possible to employ the solvent as the chloride donor in this embodiment or to use an inert solvent such as dimethylformamide and to employ a catalyst such as $FeCl_3$ in stochiometric quantities as the chloride donor and catalyst. The catalyst, i.e., Lewis acid, is necessary for the interchange to occur.

The following examples will further illustrate the invention and show the necessity of the Lewis acid.

EXAMPLE 1

| Change: | | |
|---|---|---|
| Adamantane | 15 g. | 0.111 moles |
| Bromine | 196.2 g. | 1.23 moles |
| $BBr_3$ | 83 g. | |
| $AlBr_3$ | 0.1 g. | |

Procedure:

The bromine, $BBr_3$ and $AlBr_3$ were placed in a stirred reactor (1 liter glass flask) the adamantane was added over a 1 hour period. The mixture was then heated under reflux for 3 hours, cooled, diluted with 100 cc. or carbon tetrachloride, treated with $NaHSO_3$ to deactivate the catalyst and poured over ice. The aqueous phase was extracted with $CCl_4$ and the combined organic layer and extracts dried over $CaCl_2$.

The reddish colored liquid was filtered then flash distilled to remove $CCl_4$ and bromine. The residue was analyzed by vapor phase chromatography to show approximately equal amounts of 1,3-dibromo-adamantane, 1,3-dichloroadamantane and 1,-bromo-3-chloroadamantane.

EXAMPLE 2

The procedure of example 1 was repeated using 1,3-dimethyl adamantane in place of adamantane with essentially the same result. The product was identified via VPC as approximately equal amounts of 5,7-dibromo-1,3-dimethyladamantane, 5,7-dichloro-1,3-dimethyl-adamantane and 5-bromo-7-chloro-1,3-dimethyladamantane.

EXAMPLE 3

The procedure of example 1 was repeated, however, the order of steps was altered so that the reaction mixture was treated with $NaHSO_3$ after cooling prior to dilution with 100 cc. of carbon tetrachloride. Vapor phase chromatography showed only the presence of 1,3-dibromoadamantane. The $NaHSO_3$ treatment prior to contact with the chloride donor deactivated the catalyst and prevented the bromo-chloro interchange.

The invention claimed is:

1. Chloride donor is selected from the group consisting of carbontetrachloride and chloroform.

2. A method according to claim 1 wherein the chloride donor is carbon tetrachloride and R' and R" are methyl.

3. A method according to claim 1 wherein the chloride donor is carbon tetrachloride and R' and R" are hydrogen.

* * * * *

UNITED STATES PATENT OFFICE
CERTIFICATE OF CORRECTION

Patent No. 3,626,017   Dated December 7, 1971

Inventor(s) Robert E. Moore

It is certified that error appears in the above-identified patent and that said Letters Patent are hereby corrected as shown below:

In Column 4, line 49, cancel claim 1 and insert the following claim therefor:

1. The method of substituting chloride for bromide in a dibromoadamantane having the structure

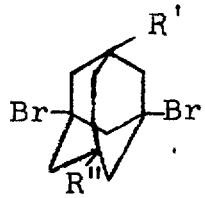

comprising contacting said dibromoadamantane at a temperature in the range of 10-75°C with a chloride donor selected from the group consisting of carbontetrachloride and chloroform in the presence of a catalytic amount of a Lewis acid containing bromide, chloride or iodide atoms, wherein $R'$ and $R''$ have 0-20 carbon atoms and are independently selected from the group consisting of hydrogen, alkyl, cycloalkyl and aryl.

Signed and sealed this 4th day of July 1972.

(SEAL)
Attest:

EDWARD M. FLETCHER, JR.   ROBERT GOTTSCHALK
Attesting Officer   Commissioner of Patents